United States Patent
Pesciarolo et al.

(10) Patent No.: US 10,126,130 B2
(45) Date of Patent: Nov. 13, 2018

(54) DEVICE FOR DETECTING THE ATTITUDE OF MOTOR VEHICLES

(71) Applicant: Magneti Marelli S.p.A., Corbetta (IT)

(72) Inventors: Alessandro Pesciarolo, Corbetta (IT); Giuseppe Spinella, Corbetta (IT); Saverio Armeni, Corbetta (IT)

(73) Assignee: Magneti Marelli S.p.A., Corbetta (IT)

( * ) Notice: Subject to any disclaimer, the term of this patent is extended or adjusted under 35 U.S.C. 154(b) by 216 days.

(21) Appl. No.: 14/934,873

(22) Filed: Nov. 6, 2015

(65) Prior Publication Data
US 2016/0131482 A1 May 12, 2016

(30) Foreign Application Priority Data
Nov. 10, 2014 (IT) .................................. 2011A0934

(51) Int. Cl.
*G01C 21/18* (2006.01)
*G01C 21/16* (2006.01)
(Continued)

(52) U.S. Cl.
CPC .............. *G01C 21/16* (2013.01); *B60W 40/10* (2013.01); *G01S 19/49* (2013.01); *G01S 19/53* (2013.01);
(Continued)

(58) Field of Classification Search
CPC ........ G01C 21/16; G01C 21/06; G01C 21/10; G01C 21/18; G01C 21/20; G01S 19/49;
(Continued)

(56) References Cited

U.S. PATENT DOCUMENTS

2009/0105900 A1    4/2009   Tan

FOREIGN PATENT DOCUMENTS

DE    102006023574 A1   11/2007
EP        1154281 A1    11/2001

OTHER PUBLICATIONS

Vasiliy M. Tereshkov, An Intuitive Approach to Inertial Sensor Bias Estimation, 2013, International Journal of Navigation and Observation, vol. 2013, Article ID 762758, 7 pp.*

(Continued)

*Primary Examiner* — Toan Le
(74) *Attorney, Agent, or Firm* — Howard & Howard Attorneys PLLC

(57) ABSTRACT

Described herein is a device for detecting the attitude of motor vehicles, which comprises using at least one filter of a complementary type for computing an estimate ($\hat{x}_i$) of angles of attitude ($\theta$, $\varphi$, $\psi$) of the motor vehicle as a function of input signals comprising an acceleration signal (A) and an angular-velocity signal ($\omega$). According to the invention, the device (10) comprises a plurality of complementary filters ($12_1, \ldots, 12_n$) each tuned for operating in a specific dynamic range, and a supervisor unit (11), that acts to recognize the dynamic range of the input signals (A, $\omega$) and select a corresponding filter ($12_i$) from said plurality of complementary filters ($12_1, \ldots, 12_n$).

9 Claims, 3 Drawing Sheets

(51) Int. Cl.
    *G01S 19/53* (2010.01)
    *B60W 40/10* (2012.01)
    *G01S 19/49* (2010.01)
    *B60W 40/11* (2012.01)
    *B60W 40/112* (2012.01)
    *B60W 40/114* (2012.01)
    *B60W 50/00* (2006.01)

(52) U.S. Cl.
    CPC ............ *B60W 40/11* (2013.01); *B60W 40/112* (2013.01); *B60W 40/114* (2013.01); *B60W 2050/0055* (2013.01); *B60W 2050/0056* (2013.01)

(58) Field of Classification Search
    CPC .. G01S 19/53; G05D 1/00; B60W 2050/0055; B60W 2050/0056
    See application file for complete search history.

(56) References Cited

OTHER PUBLICATIONS

Search Report issued by the Italian Patent Office for Italian Patent Application No. TO2014A000934 dated Jul. 1, 2015.
Higgins, Jr., Walter T., "A Comparison of Complementary and Kalman Filtering," IEEE Transactions on Aerospace and Electronic Systems, vol. AES-11, No. 3, pp. 321-325 (May 1975).
Shen, Xiaowei, et al., "Adaptive complementary filter using fuzzy logic and simultaneous perturbation stochastic approximation algorithm," Measurement, vol. 45, No. 5, pp. 1257-1265 (2012) (available online Jan. 30, 2012).

* cited by examiner

DEVICE FOR DETECTING THE ATTITUDE OF MOTOR VEHICLES

CROSS-REFERENCE TO RELATED APPLICATIONS

The present application claims priority to and all the benefits of Italian Patent Application No. 10 2013 201 247.0, filed on Jan. 25, 2013, both of which are hereby expressly incorporated herein by reference in their entirety.

BACKGROUND OF THE INVENTION

1. Field of the Invention

The present invention relates to a device for detecting the attitude of motor vehicles, using at least one filter of a complementary type to estimate angles of attitude of the motor vehicle.

2. Description of the Related Art

There are known in the sector of vehicles, including motor vehicles, inertial navigation systems (INSs) that enable, with respect to known navigation systems, based, for example, on GNSS signals, alternative or complementary navigation means. The INS records relative movements of the vehicle on which it is mounted and, on the basis of these, makes evaluations of the speed of the vehicle and the path followed.

The above INSs comprise inertial measurement units (IMUS) essentially based upon the measurements made by acceleration sensors and gyroscopes. In particular, these INSs use the measurements of accelerometers and gyroscopes to estimate angles of roll, pitch, and yaw of the motor vehicle, which enable evaluation of the attitude thereof.

INSs are based for the most part on extended Kalman filters (EKFs) in order to estimate the above angles of attitude of the vehicle using sensor-fusion techniques. This type of technique involves a high degree of computational complexity, especially if there is available a large number of sensor channels, as well as difficulty of calibration as regards the observability matrix Q and the covariance matrix R of the Kalman filter, and hence a high cost in terms of man hours for its development.

An alternative solution envisages use of complementary filters, which are instead easy to tune.

Various embodiments of complementary filters that can be used for providing an estimator of attitude are illustrated, for example, in the paper by Walter Higgins, "A comparison of complementary and Kalman filtering", Aerospace and Electronic Systems, IEEE Transactions on (Volume: AES-11, Issue: 3), May 1975. However, complementary filters are valid only for a specific dynamic range, in which the model of the vehicle can be linearly approximated.

SUMMARY OF THE INVENTION

The object of the present invention is to provide an improved device that will enable use of filters with a lower degree of complexity, maintaining the performance of extended Kalman filters.

According to the present invention, the above object is achieved thanks to a device for detecting the attitude of motor vehicles that includes using at least one filter of a complementary type for computing an estimate ($\hat{x}_i$) of angles of attitude ($\theta$, $\varphi$, $\psi$) of the motor vehicle as a function of input signals comprising an acceleration signal (A) and an angular-velocity signal ($\omega$). The device includes a plurality of complementary filters, each tuned for operating in a specific dynamic range, and a supervisor module, adapted to recognise the dynamic range of the input signals (A, $\omega$) and select (S) a corresponding filter in said plurality of complementary filters.

Other objects, features and advantages of the present invention will be readily appreciated as the same becomes better understood after reading the subsequent description taken in connection with the accompanying drawings.

BRIEF DESCRIPTION OF THE DRAWINGS

The invention will now be described with reference to the annexed drawings, which are provided purely by way of non-limiting example and in which.

DETAILED DESCRIPTION OF THE INVENTION

In brief, the solution according to the invention regards a device for detecting the attitude of motor vehicles that comprises using at least one filter of a complementary type to estimate angles of attitude of the motor vehicle, the device including a plurality of complementary filters, each tuned for operating in a specific dynamic range, and a supervisor unit, that acts to recognise the dynamic range of the input signals and select a corresponding filter in said plurality of complementary filters.

Figure 1:
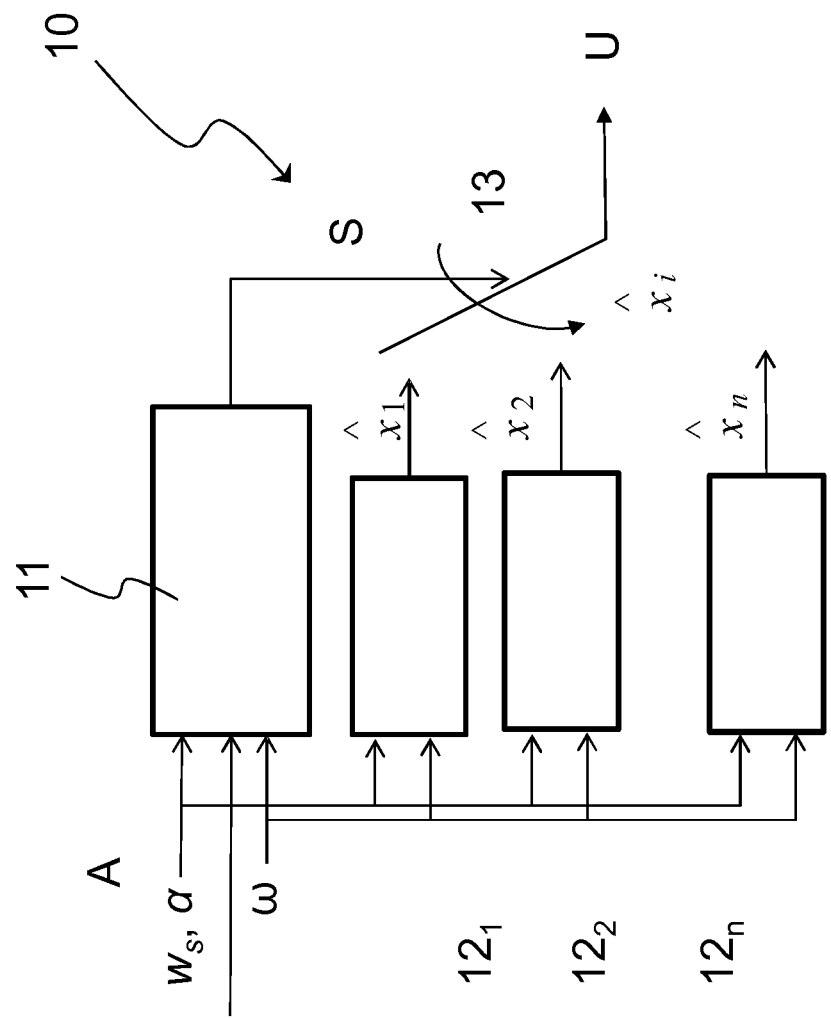
FIG. 1 is a schematic perspective view of a device described herein.

Illustrated in FIG. 1 is a block diagram of an attitude-detection device according to the invention designated as a whole by the reference number 10.

Shown at input to the above attitude-detection device 10 is a signal representing an acceleration A of the motor vehicle, measured by an accelerometer, not illustrated in FIG. 1. The aforesaid acceleration A of the vehicle comprises components of acceleration with amplitudes of acceleration $A_x$, $A_y$, $A_z$ along three mutually perpendicular axes x, y, z, measured, for example, by a triaxial accelerometer device.

Moreover shown at input to the attitude-detection device 10 is a signal representing an angular velocity $\omega$ of the vehicle measured by a gyroscope, which is not illustrated in FIG. 1 either. This angular velocity $\omega$ also comprises three components, p, q, r, expressed in the co-ordinates of the body, i.e., of the sensor.

The attitude-detection device 10 includes a bank 12 of complementary filters. This bank 12 of filters comprises a plurality of complementary filters $12_1, \ldots, 12_n$, each of which receives in parallel the acceleration signal A and the angular-velocity signal $\omega$. Each i-th complementary filter $12_i$ supplies at output a respective i-th estimate $\hat{x}_i$ of the angles of attitude of the vehicle, i.e., angles of roll $\theta$, pitch $\varphi$, and yaw $\psi$, as represented in greater detail with reference to FIG. 2.

The attitude-detection device 10 further comprises a supervisor module 11, which also receives at input the acceleration signal A and the angular-velocity signal $\omega$, the velocities of the four wheels $w_s$, and the steering angle $\alpha$ and, on the basis of the values of these signals, controls, via a selection signal S, a selector 13 so that it connects one of the outputs $\hat{x}_i$ of the filters $12_i$ to an output U of the attitude-detection device 10.

Figure 2:
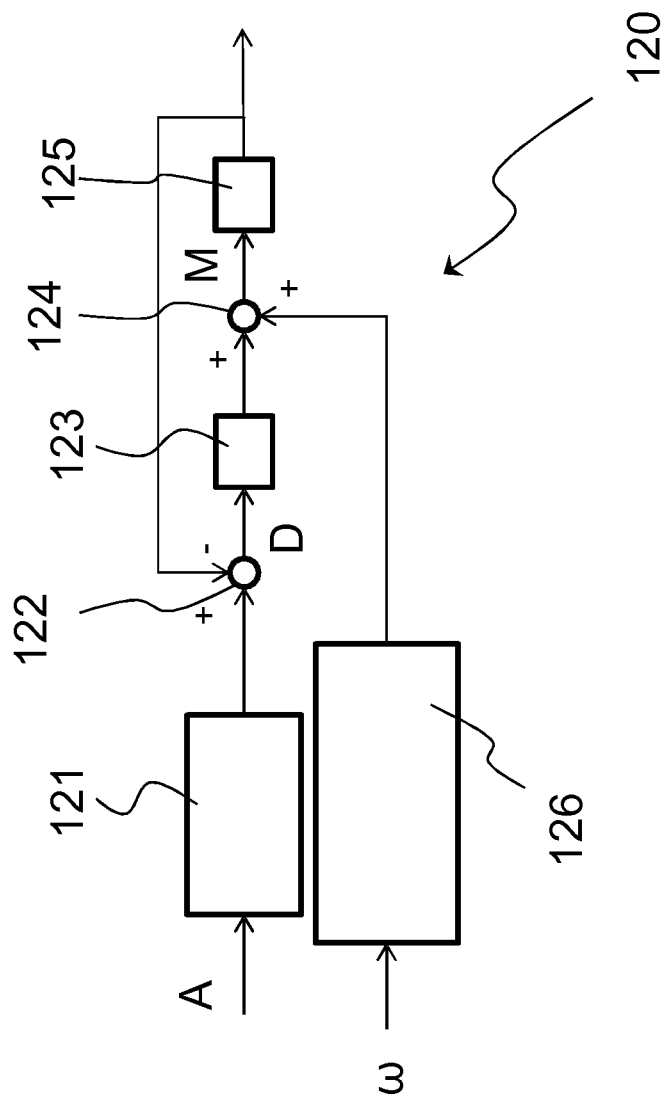
FIG. 2 is a detailed view of a filter of the device of FIG. 1.

The above operation of tuning of each filter $12_i$ for a different dynamic range is obtained in particular by setting a value of a respective time constant τ of the filter $12_i$, as described more clearly in what follows with reference to FIG. 2. The filters $12_i$ are equipped with different time constants τ, these different time constants τ rendering each filter $12_i$ more suited to operating in a different dynamic range, i.e., to supplying an estimate $\hat{x}_i$ of the angles of attitude of the vehicle that is more accurate in that particular dynamic range of the input signals.

The supervisor module 11 acts to detect the dynamic range associated to the acceleration signal A and to the angular-velocity signal ω at input generated by the vehicle while it is travelling and for selecting the complementary filter $12_i$ tuned for the corresponding dynamic range.

In various embodiments, the supervisor module 11 acts to detect the level, i.e., the amplitudes $A_x$, $A_y$, $A_z$ of the acceleration signal A and the level, i.e., the amplitudes p, q, r of the angular velocity that can be derived from the angular-velocity signal ω supplied by the gyroscope.

In a preferred embodiment, the supervisor module may comprise, for example stored in a memory of the microcontroller that implements it, a plurality of different models of the vehicle that estimate one or more of the acceleration values $A_x$, $A_y$, $A_z$ and/or of the signals of the gyroscope p, q, r, on the basis of other measured values of dynamic quantities of the vehicle that affect the value of the attitude in order to identify the appropriate complementary filter to be used in the estimate of attitude.

The models stored are different in so far as they take into account different operating conditions of the vehicle, both in terms of dynamic range (for example, range of speeds, acceleration, values of friction) and in terms of type of manoeuvre.

Figure 3:
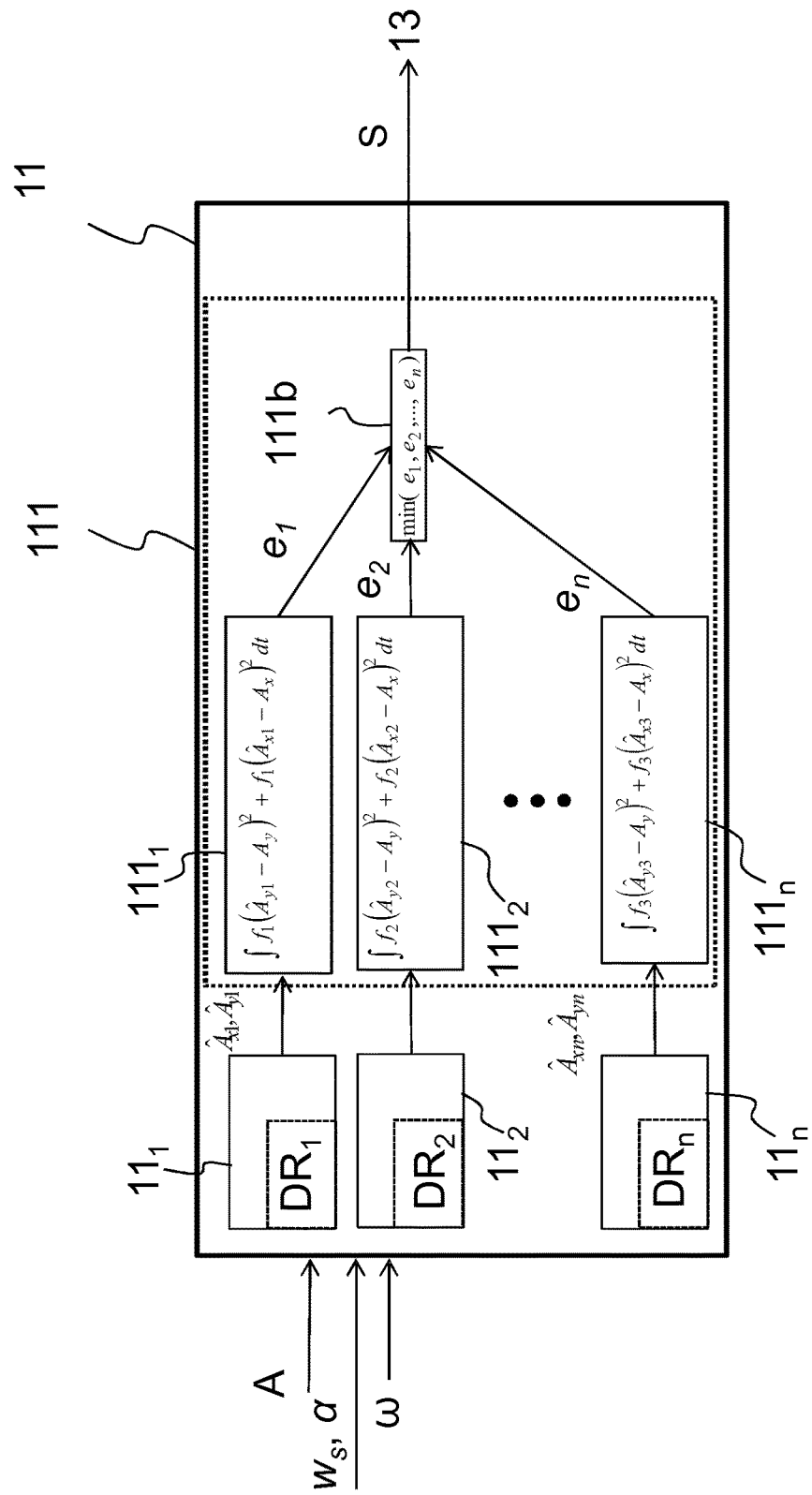
FIG. 3 is a schematic view of an embodiment of a selector of the device of FIG. 1.

In this connection, FIG. 3 illustrates an example of supervisor 11 comprising a plurality of different vehicle models $11_1, \ldots, 11_n$.

The supervisor block 11 further comprises an evaluator block 111, that evaluates which of the aforesaid vehicle models $11_1, \ldots, 11_n$ makes the best estimate of a current dynamic state of the vehicle. On the basis of the evaluation of the evaluator block 111, i.e., on the basis of the j-th model $11_j$ that best estimates the dynamic state of the vehicle, the model of the complementary filter $12_1, \ldots, 12_n$ to be used is chosen, by issuing a corresponding selection signal S.

In particular, in the example of FIG. 3, each model $11_j$ supplies its own estimates of the amplitudes of the accelerations $\hat{A}_{yj}$, $\hat{A}_{xj}$ on the basis of the input data of the velocities of the four wheels $w_s$ and on the basis of the steering angle α. Each vehicle model $11_j$ estimates in an optimal way the accelerations $\hat{A}_{yj}$, $\hat{A}_{xj}$ in a given dynamic range of input quantities, i.e., values of the velocities of the four wheels $w_s$ and steering angle α, corresponding to given ranges of the dynamic quantities to be estimated, in the specific case the accelerations $\hat{A}_{yj}$, $\hat{A}_{xj}$, which in turn correspond to a given value of the time constant τ of the filter 12.

Evaluation of the vehicle model $11_j$ in the evaluation block 111 may, for example, be carried out by measuring an error $e_j$ as distance of estimates $\hat{A}_x$, $\hat{A}_y$, $\hat{A}_z$ of the accelerations from the acceleration values Ax, Ay, Az, effectively measured by the inertial platform. In general, this distance may be obtained via calculation of a norm applied to these estimates $\hat{A}_x$, $\hat{A}_y$, $\hat{A}_z$ and to the corresponding measurements $A_x$, $A_y$, $A_z$.

The above norm may be of different types; for example, it may be a norm that calculates a Euclidean distance between quantities.

In a preferred embodiment, the above distance, or, error $e_j$ may be obtained as $$\int f(\hat{A}_z - A_z)^2 + f(\hat{A}_y - A_y)^2 + f(\hat{A}_x - A_x)^2 dt$$

i.e., a norm where to the quadratic distances between the components a cost functional f is moreover applied to take into account specific aspects of the vehicle condition, understood as dynamic range, but also as type of manoeuvre and possibly other parameters such as conditions of friction or wind.

The above cost functional f may be implemented, for example, as a weighted measurement, i.e., as a weight applied to the norm or to the measurement of distance, the weights being chosen on the basis of observations on standard manoeuvres carried out by the motor vehicle.

It should be pointed out that the evaluator 111 operates in the first place to calculate the closeness between the estimate and the measurement supplied by each model. In this perspective, the cost functional f represents a possible further degree of freedom that can be applied to the evaluator 111 to render it more flexible in regard to particular vehicle conditions. In theory, the model could be complex to the point of taking into account every parameter of interest for the estimate and not require the above functional, or else a less flexible estimate without the functional may be accepted. Hence, in various embodiments, the aforesaid cost functional f is not present, or may be equal to 1 in the equation appearing above.

In various embodiments, the above cost functional f may be the same for all the models $11_1, \ldots, 11_n$.

In various embodiments, the aforesaid cost functional f is different for different models associated to different dynamic ranges, to take into account, for example, the specificity of certain manoeuvres associated to those dynamic ranges and models. There may be applied to the blocks $11_1, \ldots, 11_n$ functionals $f_j$ that represent, for example, a vehicle condition with low coefficient of friction, a condition of highspeed ring, or a condition of twist of the steering wheel.

In the example specifically described in FIG. 3, as has been said the vehicle model $11_1$ may use a cost functional f that calculates an error $e_j$ corresponding to $$\int f(\hat{A}_{yj} - A_y)^2 + f(\hat{A}_{xj} - A_x)^2 dt$$

where $\hat{A}_{yj,xj}$ is an estimate of the acceleration along the axes x and y for each model $11_j$, $A_{y,x}$ is the corresponding measurement made by the inertial platform, and f is the cost functional.

The minimum $\min(e_1, e_2, \ldots, e_n)$ of the error $e_j$ evaluated in block 111, determines the value assumed by the selection signal S, which corresponds to the choice of the model $11_j$ associated to a respective dynamic range $DR_j$ that best estimates the quantity at its input, and hence to the choice of the complementary filter $12_1, \ldots, 12_n$ to be used dynamically that best operates in the corresponding dynamic range $DR_i$.

Each vehicle model $11_j$ with j=1, . . . , n defines a particular vehicle condition whereby a given error $e_j$ is the minimum for all the models considered if the accelerations and angular velocities measured derive from the vehicle condition associated to the corresponding model $11_j$. The vehicle model $11_j$ identifies a particular dynamic range of the vehicle quantities $A_x$, $A_y$, $A_z$, of the acceleration signal A and of the angular velocities p, q, r measured. Furthermore, for each vehicle model $11_j$ there exists just one filter $12_i$ with a time constant τ defined for that particular vehicle condition.

In particular, for example, stored in the supervisor module 11 is a look-up table or other data structure that sets each of the vehicle models $11_1, \ldots, 11_n$ in relation with one of the filters $12_1, \ldots, 12_n$. It is envisaged to construct empirically the above look-up table by identifying, on the basis of the correctness of the estimator $\hat{x}_i$ supplied at output, the value of time constant τ that corresponds to a given dynamic range, i.e., that enables a correct estimate of the angle of attitude, for example within a pre-defined error value. Hence, in the look-up table the vehicle model $11_j$ associated to that given dynamic range is set in relation with the filter with time constant that enables correct estimation of the attitude in the context of the system 10. When the minimum $\min(e_1, e_2, \ldots, e_n)$ of the error $e_j$ indicates that a certain model $11_j$ is the most suited to the dynamic range of the acceleration and/or gyroscopic signals at input, by accessing the look-up table with the index of that model $11_j$ at output there is obtained, as selection signal S, the index of the filter $12_i$ with a time constant τ suited to its dynamic range and hence to be selected to obtain the best estimate of attitude.

The supervisor module 11 is obtained via a microprocessor module, for example the ECU of the motor vehicle. Also the selector 14 may be integrated within this microprocessor.

Illustrated in FIG. 2 is a detailed diagram of a complementary filter $12_i$. This complementary filter $12_i$ comprises a module 121 for computing the angle of inclination, or tilt, which receives at input the acceleration signal A and supplies calculated values of the angles of roll θ, pitch φ, and yaw ψ. This is achieved according to the following relations, in themselves known:

$$\theta = \arctan\left(\frac{A_x}{\sqrt{A_y^2 + A_z^2}}\right) \quad (1)$$

$$\varphi = \arctan\left(\frac{A_y}{\sqrt{A_x^2 + A_z^2}}\right)$$

$$\psi = \arctan\left(\frac{\sqrt{A_x^2 + A_y^2}}{A_z}\right)$$

The complementary filter $12_i$ further comprises a module for computing attitude rates 126, which receives at input the angular-velocity signal ω and performs the calculation of the values of the first derivatives of the angles of roll θ, pitch φ, and yaw ψ, i.e., $\dot{\theta}, \dot{\varphi}, \dot{\psi}$. The attitude-rate computing module 126 makes, in particular, the following calculation:

$$\dot{\varphi} = p + \tan\theta(q\sin\psi + r\cos\psi) \quad (2)$$

$$\dot{\theta} = q\cos\varphi - r\sin\varphi$$

$$\dot{\psi} = \frac{q\sin\varphi + r\cos\varphi}{\cos\theta}$$

From the angular velocities p, q, r measured by the gyroscope and from the values of the angles of attitude, or Euler angles, it is possible to measure the attitude rates, i.e., the first derivatives $\dot{\theta}, \dot{\varphi}, \dot{\psi}$ of the Euler angles using Eqs. (2), which are in themselves known.

In particular, the above Eqs. (2) may be written in matrix form as:

$$\begin{vmatrix} \dot{\varphi} \\ \dot{\theta} \\ \dot{\psi} \end{vmatrix} = A^{-1}(\varphi, \theta, \psi) \begin{vmatrix} p \\ q \\ r \end{vmatrix} \quad (3)$$

taking into account that $$A^{-1}(\varphi, \theta, \psi) = \begin{vmatrix} \cos(\theta) & 0 & \sin(\theta) \\ \sin(\theta)\tan(\varphi) & 1 & -\cos(\theta)\tan(\varphi) \\ -\frac{\sin(\theta)}{\cos(\varphi)} & 0 & \frac{\cos(\theta)}{\cos(\varphi)} \end{vmatrix} \quad (4)$$

The relations (3) and (4) represent the construction of block 126, the matrix $A^{-1}$ being the matrix of rotation that enables calculation of the angular velocities $\dot{\theta}, \dot{\varphi}, \dot{\psi}$ in the vehicle reference system starting from the angular velocities p, q, r measured by the gyroscope (sensor reference system) and from the estimate of the angles of roll θ and pitch φ.

The calculated values of the angles of roll θ, pitch φ, and yaw ψ are supplied by the tilt-angle computing module 121 at input, as set-point, to a control loop that as a whole constitutes a complementary lowpass filter and a complementary highpass filter, through a derivator block 123, with time constant τ, and an integrator block 125. Specifically, the aforesaid calculated values of the angles of roll θ, pitch φ, and yaw ψ are supplied at input, as set-point, to an adder node 122, which computes the difference with respect to the estimate $\bar{x}_i$ at output from the complementary filter $12_i$. The corresponding difference signal D is supplied at input to the derivator 123, which has a time constant τ. The output of the derivator 123 is supplied to a second adder node 122, which adds it to the attitude rates $\dot{\theta}, \dot{\varphi}, \dot{\psi}$ supplied at output from the attitude-rate computing module 126. The corresponding addition signal M is supplied to the integrator 125, which supplies at output the estimate of the angle of attitude of the vehicle $\hat{x}_i$.

Hence, the complementary filter $12_i$ is in this way used for combining two independent measurements that are in themselves noisy, i.e., the acceleration signal A supplied by the accelerometer and the angular-velocity signal ω supplied by the gyroscope, where each measurement is corrupted by different types of spectral noise. The filter $12_i$ provides an estimate of the real angle of attitude of the vehicle $\hat{x}_i$ via the two complementary highpass and lowpass filters with time constant τ.

The values of the angles of roll θ, pitch φ, and yaw ψ are supplied already directly by the tilt-angle computing module 121 on the basis of the acceleration signal A. This measurement, however, is accurate only at low dynamics.

The time constant τ according to a main aspect of the solution described herein is set different for each filter $12_i$ so as to tune the respective filter to a different dynamic range of the input signals A and ω.

Hence, from what has been described above, the advantages of the solution proposed emerge clearly.

The device for detecting the attitude of motor vehicles via the use of a bank of complementary filters enables use of filters with a lower degree of complexity, maintaining the performance of extended Kalman filters.

The device for detecting the attitude of motor vehicles, as compared to the extended Kalman filter used in applications linked to the dynamics of the motor vehicle, guarantees levels of performance that fully meet the specifications, but with a reduction of the complexity of tuning of the filters and of the use of computational resources.

The device for detecting the attitude of motor vehicles based upon an approach of the 'Data Fusion' type combines the measurements of gyroscopic and acceleration sensors present on board the vehicle in the framework of an inertial navigation system (INS), increasing and advantageously enriching each of the above measurements, so that there is obtained, for the vehicle, a powerful system of positioning of the attitude on three axes.

The estimate of attitude can be used for continuous mobile positioning obtained with the IMU.

The stable relative position supplied by the INS can then be used as bridge information for covering periods of time during which a navigator based upon GNSS signals, in particular GPS signals, receives degraded signals or these signals are not available.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A device for detecting the attitude of motor vehicles that comprises:

using at least one filter of a complementary type for computing an estimate ($\hat{x}_i$) of angles of attitude ($\theta$, $\varphi$, $\psi$) of the motor vehicle as a function of input signals including an acceleration signal (A) and an angular-velocity signal ($\omega$);

said device including a plurality of complementary filters, each tuned for operating in a specific dynamic range; and a supervisor module, adapted to recognise the dynamic range of the input signals (A, $\omega$) and select a corresponding filter in said plurality of complementary filters, receiving the acceleration signal (A) and the angular-velocity signal ($\omega$) measured by respective sensors and, on the basis of the values of said input signals (A, $\omega$), controls a selector so that it selects one of the estimates ($\hat{x}_i$) available at the outputs of said plurality of complementary filters as output (U) of the attitude-detection device;

said supervisor module including a plurality of models of the vehicle defined as a function of dynamic quantities of the vehicle that affect the value of the attitude, each of said models generating an estimate of the dynamic quantities ($\hat{A}_x$, $\hat{A}_y$, $\hat{A}_z$) comprising one or more of the acceleration values (Ax, Ay, Az) and/or of the gyroscope signals (p, q, r), said supervisor module further including a module for evaluating the model in said plurality of models that best estimates the current condition ($DR_i$) of the vehicle, and selecting a corresponding filter from said plurality of complementary filters on the basis of said evaluation.

2. The device as set forth in claim 1, wherein said supervisor module that acts to detect the level (Ax, Ay, Az) of the acceleration signal (A) and the level (p, q, r) of the angular velocity ($\omega$) and select, on the basis of said levels, the complementary filter to be used in the estimate of attitude from said plurality of complementary filters.

3. The device as set forth in claim 2, wherein said complementary filter comprises a module for computing the angle of inclination, or tilt, which receives at input the acceleration signal (A) and is adapted for supplying calculated values of the angles of roll ($\theta$), pitch ($\varphi$), and yaw ($\psi$), and a module for computing attitude rates, which receives at input the angular-velocity signal ($\omega$) and is adapted for computing the values of the first derivatives ($\dot{\theta}$, $\dot{\varphi}$, $\dot{\psi}$) of said angles of roll ($\theta$), pitch ($\varphi$), and yaw ($\psi$), said tilt-angle computing module and said attitude-rate computing module supplying said outputs to a control loop comprising complementary filters.

4. The device as set forth in claim 3, wherein the output of said tilt-angle computing module is supplied as set-point to the control loop for generating a difference signal (D) with respect to the estimate of attitude at output from the control loop, while the signal at output from the attitude-rate computing module is added to the output of a derivator block, which receives at input said difference signal (D), a resulting addition signal being supplied as input to an integrator, which generates said estimate of the angle of attitude of the vehicle ($\hat{x}_i$).

5. The device as set forth in claim 3, wherein said control loop acts as a complementary lowpass filter and a complementary highpass filter, the time constant ($\tau$) of which is set for tuning the filter with respect to a given dynamic range.

6. The device as set forth in claim 1, wherein said supervisor module comprises a plurality of different models of the vehicle that estimate one or more of the acceleration values (Ax, Ay, Az) and/or of the gyroscope signals (p, q, r) on the basis of measured values of dynamic quantities of the vehicle that affect the value of the attitude.

7. The device as set forth in claim 6, wherein said evaluation module is adapted for measuring an error ($e_1$, ..., $e_n$) of each model calculated as distance of estimates ($\hat{A}_x$, $\hat{A}_y$, $\hat{A}_z$) of each model from the values (Ax, Ay, Az) effectively measured and for identifying the minimum value (min ($e_1$, $e_2$, ..., $e_n$)) of said error ($e_1$, ..., $e_n$) and the corresponding model.

8. The device as set forth in claim 7, wherein said evaluation module is adapted for applying in the calculation of said distances ($e_1$, ..., $e_n$) a cost functional (f) associated to a given condition of the vehicle, in particular a weighted measurement, the weights of which are chosen on the basis of observations on manoeuvres made by the motor vehicle.

9. The device as set forth in claim 1, wherein it is comprised in an inertial navigation system of a motor vehicle.

* * * * *

UNITED STATES PATENT AND TRADEMARK OFFICE
CERTIFICATE OF CORRECTION

PATENT NO. : 10,126,130 B2
APPLICATION NO. : 14/934873
DATED : November 13, 2018
INVENTOR(S) : Alessandro Pesciarolo et al.

It is certified that error appears in the above-identified patent and that said Letters Patent is hereby corrected as shown below:

On the Title Page

Item (30) Foreign Application Priority Data:
Delete "2011A0934" and insert therefor --TO 2014 A 000934--.

Signed and Sealed this
Nineteenth Day of February, 2019

Andrei Iancu
*Director of the United States Patent and Trademark Office*